Oct. 13, 1959  A. T. GREGORY ET AL  2,908,518
CENTERING DEVICE
Filed June 26, 1956
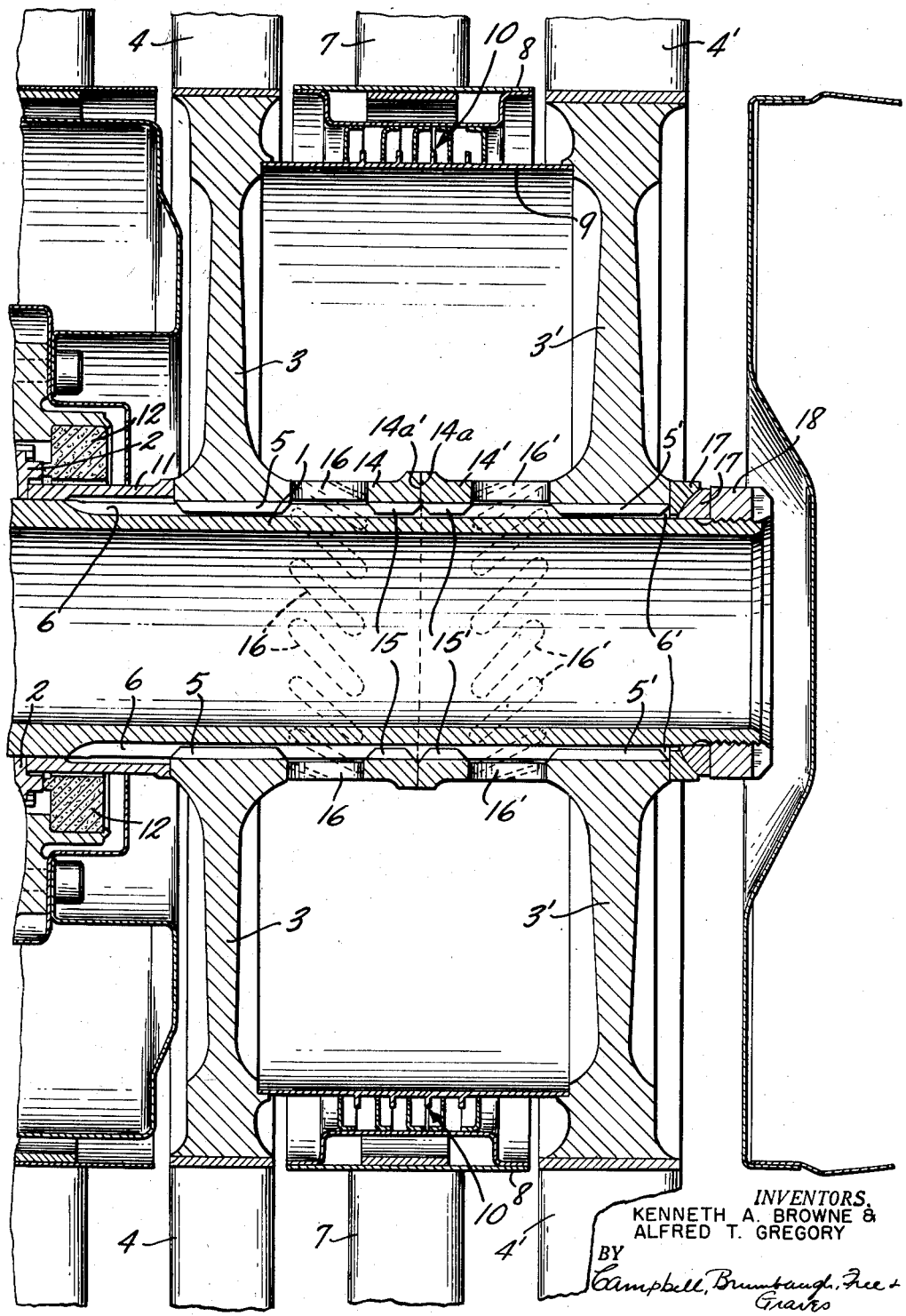
INVENTORS,
KENNETH A. BROWNE &
ALFRED T. GREGORY
BY
Campbell, Brumbaugh, Free &
Graves
their ATTORNEYS.

United States Patent Office 2,908,518
Patented Oct. 13, 1959

2,908,518

CENTERING DEVICE

Alfred T. Gregory, Manhasset, N.Y., and Kenneth A. Browne, Lakewood, Ohio, assignors to Fairchild Engine and Airplane Corporation, Deer Park, N.Y., a corporation of Maryland Application June 26, 1956, Serial No. 594,038

9 Claims. (Cl. 287—52)

This invention relates to means for maintaining the position of a member on a rotating shaft to insure concentricity of the member on the shaft, even at high speeds of rotation of the shaft and when exposed to high operating temperatures.

In a machine wherein a body is supported by a splined connection on a rapidly rotating shaft, there is a tendency for the inner periphery of the body surrounding the shaft to expand, due to the effect of centrifugal force, thus increasing the clearance between the body and the shaft. This condition is aggravated in machines wherein the body supported on the shaft is exposed to high temperature during operation, thereby further increasing the clearance between the shaft and the body.

Under normal operating conditions there is a high torque produced by the body, in this case a turbine disk, which keeps the splines of the body tight against the driving side of the splines on the shaft. So long as uniform contact is maintained on the driving side of the shaft splines, which are of the involute form, the turbine disk will be maintained concentric with the shaft. It is important that the turbine disk should be maintained concentric with the shaft under all conditions, even when a high torque is not present, as for example, when the shaft is stationary or during deceleration. The present invention embodies means for insuring that the turbine disk splines are maintained tightly against the driving side of the shaft splines under all conditions including stationary and decelerating conditions.

The turbine disk is provided with an integral hub extension on one side, and internal splines formed in the hub bore are not continuous with the internal splines formed in the turbine disk bore. A plurality of parallel diagonal slots are provided through the hub wall intermediate the splines formed in the hub bore and the splines formed in the turbine disk bore, leaving the remaining wall material in the form of diagonal struts. When an axial compressive force is exerted on the turbine hub, as by the tightening of a retaining nut, the effect is to cause the turbine disk and the hub to rotate relative to each other. By proper selection of the angle of the helical slots, the turbine disk splines will be caused to bear in one direction against the shaft splines, preferably against the driving side of the shaft splines, and the hub bore splines will be caused to bear in the other direction against the shaft splines, preferably against the anti-driving side of the shaft splines. When the turbine disk is thus locked on its shaft, it will be automatically centered.

Accordingly, the present invention provides for maintaining concentricity between the turbine disk and shaft under all conditions.

For a complete understanding of the present invention, reference may be had to the detailed description which follows and to the accompanying drawing wherein the figure is a cross-section view of the application of the present invention to a turbine shaft supporting a plurality of disks thereon which are connected to the shaft by splines.

Referring to the drawing, a turbine shaft 1 rotatably supported in a bearing 2 carries thereon turbine disks 3 and 3', the outer peripheries of which carry turbine blades 4, 4'. The disks 3, 3' are formed with splines 5, 5' which mesh with and interlock with longitudinal or involute slots 6 formed in the outer periphery of the shaft.

Turbine nozzles or stator vanes 7 are interposed between the blades 4 and 4', and a circular shroud 8 is attached to the inner ends of the stator vanes 7. The shroud 8 carries labyrinth seal 10 in close proximity to the turbine seal ring 9 which encloses the space between the turbine disks 3, 3', all conventional parts of a turbine.

A spacer ring 11 is carried by the shaft between the bearing 2 and disk 3, and a seal ring 12 is provided to form a seal between the turbine shaft and the bearing.

Turning now to a description of the present invention, hubs 14 and 14' of resilient metal are formed integrally on the disks 3, 3', respectively, said hubs 14 and 14' extending toward each other in such fashion that the ends 14a and 14a' of the hubs 14, 14' are in abutting contact. The hubs 14 and 14', of course, surround the periphery of the shaft 1, and they are provided with splines 15, 15', respectively, which splines 15 and 15' engage the slots 6 formed in the outer periphery of the shaft 1. The splines 15 of the hub 14, however, are separated from the splines 5 of the disk 3, and the splines 15' of the hub 14' are separated from the splines 5' of the disk 3'.

As indicated in the drawing, the hub 14 is provided with a plurality of elongated slots 16, which extend through the wall of the hub. These slots 16 are substantially parallel and spaced equally around the entire periphery of the hub 14, and they are angularly disposed with respect to the axis of the shaft 1 and the hub 14. Likewise, the hub 14' contains a plurality of substantially equally spaced parallel slots 16' therein, at spaced intervals around the entire periphery of the hub. The slots 16', like the slots 16, extend at given angles with respect to the axis of the hub. However, as shown in the drawings, the angular disposition of the slots 16 preferably run in opposite fashion to the slots 16'.

The splines 5, 5', 15 and 15' are formed to fit the slots 6 accurately but with sufficient looseness to allow ease of assembly and disassembly. The slots 16 and 16', however, permit sufficient flexure of the walls of the hubs 14 and 14' when the disks 3, 3' are compressed to insure maintaining side pressure of the splines against the walls of the slots 6 at all times. It is evident, therefore, that if the disks 3 and 3' and hubs 14 and 14' are compressed in such fashion as to twist the walls of the hubs 14 and 14', the hubs 14, 14' will be twisted axially in opposite directions. Thus, the splines 15 will be urged in one direction into contact with the walls of the slot 6, preferably against the walls of the driving side of the splines, whereas the splines 5 will be urged in the opposite direction into pressure contact with the opposite walls thereof, preferably the anti-driving side of the splines 6. Also, the splines 5' and 15' will be urged in opposite directions into contact with opposite walls of the slots 6, the splines 15' engaging the driving side of the splines 6 and the splines 5' engaging the anti-driving side thereof. While this pressure compressing the disks 3 and 3' together is maintained, the spline connections between the disks 3 and 3' and the shaft 1 will be such as to form a locking action therebetween, while locking action will resist the establishment of any clearance between the disks and the shaft which might tend to produce eccentricity or vibration effects.

In order to facilitate the application of this compressive force between the disks 3 and 3' to produce flexure of the hubs 14 and 14', the extreme end of the shaft accommodates a pair of retaining washers 17 and a retaining nut 18 which is threadably coupled with the shaft. Thus, when the retaining nut 18 is tightened on the shaft 1, a compressive force is exerted through the washers 17, the disk 3' and the hub 14' thereof, the hub 14 and the disk 3 and the spacer ring collar 11. This compressive force twists the hubs 14, 14' in axial directions. This twisting urges the splines 15 of the hub and the splines 5 of the disk into contact with opposite walls of the slots 6 of the shaft, and further urges the splines 15' of the hub 14' and the splines 5' of the disk 3' into contact with the opposite walls of the slots 6 to the shaft 1. Since the disks 3, 3' and their respective hub portions are kept under high compressive pressure, the tendency of the axis of either of the disks to move away from the axis of the shaft is resisted, thereby assuring desired balance and concentricity.

The turbine disk will tend to expand under the action of centrifugal force, and this expansion will shorten the hub in an axial direction. This shortening of the hub in an axial direction may cause the turbine disk to become loose on the shaft unless adequate flexibility is provided in the locking means to compensate for it. Such flexibility may be obtained by providing an adequate length of the shaft between the face of the retaining nut and the shoulder on the shaft, so that the shaft itself is stretched sufficiently during clamping of the disk to take up any reduction in hub length resulting from centrifugal expansion during operation.

The invention has been shown in a single preferred form and by way of example only, and obviously many modifications and variations may be made therein without departing from the spirit of the invention. The invention, therefore, is not to be limited to any specified form or embodiment, except in so far as such limitations are set forth in the claims.

We claim:

1. An apparatus comprising a rotating shaft, a member supported on said rotating shaft and splined thereto, extended means resiliently connected to said member and surrounding the shaft, a spline connection between the shaft and the extended means, and means to exert an axial compressive force on said member and said extended means which tends to twist the member and the extended means relative to each other, thereby maintaining the splines formed on the member in contact with the splines formed on the shaft.

2. An apparatus comprising a rotating shaft, a member supported on said rotating shaft and connected thereto by splines, an extension connected to said member and surrounding said shaft, a spline connection between the shaft and the extension, resilient connecting means between said member and said extension, said resilient connecting means being disposed at angles to the axis of the shaft to twist the member and the extension relative to each other when the member and the extension are subjected to an axial compressive force, and means for subjecting the member and the extension to an axial compressive force, thereby urging the splines of the member and the splines of the extension in opposite directions.

3. An apparatus as set forth in claim 2 wherein the resilient connecting means comprises a plurality of substantially parallel diagonal struts between the member and the extension.

4. An apparatus comprising a rotating shaft, a member supported on said rotating shaft and connected thereto by splines, an extension connected to said member and surrounding the shaft, a spline connection between the shaft and the extension, resilient connecting means between said member and said extension, said resilient connecting means being disposed at angles to the axis of the shaft to twist the member and the extension relative to each other when the member and the extension are subjected to a compressive axial force, and a retaining means threadably coupled with the shaft which, when tightened, subjects the member and the extension to a compressive force, thereby producing rotational displacement between the member and the extension.

5. In an apparatus including a rotating shaft, a member supported on said rotating shaft and a spline connection between the member and the shaft, a hub formed integrally on said member supported on the rotating shaft, said hub including a flexible portion between the member and the end of the hub remote from the member to permit the remote end of the hub and the member to be twisted relatively to each other, a spline connection between the member and the shaft, a spline connection between the remote end of the hub and the shaft, and means to apply force on said member and said hub which tends to twist the remote end of the hub and the member relatively to each other, thereby urging the splines formed on the member and the splines formed on the remote end of the hub in opposite directions.

6. The apparatus set forth in claim 5 in which the flexible portion of the hub comprises a plurality of slots formed through the wall of the hub at an angle to the axis of the shaft, said slots being loacted in a manner to lessen the resistance to relative rotational displacement between the member and the portion of the hub more remote from the member, thereby permitting said twisting action.

7. The apparatus set forth in claim 5 in which the flexible portion of the hub comprises a plurality of diagonal struts connecting the remote end of the hub and the member which, when the hub and the member are subjected to a compressive force, permits said twisting action.

8. Means for mounting a body on a rotatable shaft comprising a spline connection between the body and the shaft, a hub formed integrally with the body and encircling the shaft, a spline connection between the shaft and the hub, a plurality of slots through the wall of the hub angularly disposed with respect to the axis thereof, whereby the hub and the body will be twisted relative to each other when subjected to compressive force, and means for applying an axial, compressive force on the hub and the body, said twisting action causing the splines of the body and the splines of the hub to exert pressure circumferentially in opposite directions against the splines of the shaft.

9. Means for mounting a body on a rotating shaft comprising a spline connection between the body and the shaft, a hub formed integrally with the body, a spline connection between the hub and the shaft, said spline connection being spaced apart from the spline connection between the body and the shaft, a resilient portion intermediate the hub and the body which, when the hub and body are subjected to an axial compressive force, rotatably displaces the hub and the body, and retaining means carried by the shaft on opposite sides of the body whereby said axial compressive force may be applied to urge the splines of the body and the splines of the hub in opposite directions against the walls of the splines of the shaft.

References Cited in the file of this patent

UNITED STATES PATENTS 2,611,632   Harris _____ Sept. 23, 1952

FOREIGN PATENTS 219,655   Great Britain _____ Oct. 9, 1924